(12) United States Patent
Calo et al.

(10) Patent No.: US 8,484,246 B2
(45) Date of Patent: Jul. 9, 2013

(54) DISCOVERABLE APPLICABILITY OF DYNAMICALLY DEPLOYABLE SOFTWARE MODULES

(75) Inventors: Seraphin B. Calo, Hawthorne, NY (US); Xiping Wang, Hawthorne, NY (US); David A. Wood, III, Hawthorne, NY (US); Petros Zerfos, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 12/703,235

(22) Filed: Feb. 10, 2010

(65) Prior Publication Data

US 2011/0196885 A1 Aug. 11, 2011

(51) Int. Cl.
- G06F 7/00 (2006.01)
- G06F 17/30 (2006.01)
- G06F 15/173 (2006.01)
- G06F 15/16 (2006.01)
- G06F 17/00 (2006.01)

(52) U.S. Cl.
USPC .......... 707/781; 709/223; 709/224; 709/225; 709/229; 726/1

(58) Field of Classification Search
USPC .................. 707/694, 781; 709/223, 224, 225, 709/229; 726/1
See application file for complete search history.

(56) References Cited

U.S. PATENT DOCUMENTS

| | | | |
|---|---|---|---|
| 6,988,133 B1 | 1/2006 | Zavalkovsky et al. | |
| 7,032,022 B1 | 4/2006 | Shanumgam et al. | |
| 7,099,932 B1 | 8/2006 | Frenkel et al. | |
| 7,106,756 B1* | 9/2006 | Donovan et al. | 370/468 |
| 7,117,195 B2 | 10/2006 | Chantrain et al. | |
| 7,506,102 B2 | 3/2009 | Lev-Ran et al. | |
| 2003/0126190 A1* | 7/2003 | Wada et al. | 709/201 |
| 2005/0256947 A1 | 11/2005 | Devarakonda et al. | |
| 2006/0041666 A1* | 2/2006 | Karremans | 709/229 |
| 2006/0259952 A1 | 11/2006 | Lok | |
| 2006/0277305 A1 | 12/2006 | Bernardin et al. | |
| 2009/0077251 A1 | 3/2009 | Brown et al. | |
| 2010/0312740 A1* | 12/2010 | Clemm et al. | 706/47 |
| 2010/0325692 A1* | 12/2010 | Rissanen | 726/1 |

OTHER PUBLICATIONS

IBM, Jan. 4, 1007, "Pre-acceptance Profiling of Systems Management Software Modules.", pp. 1-2.
IBM, Jul. 2, 2009, "Method and Apparatus to Authorize Resources by Different Authorization Modules.", pp. 1-3.
Li, D. et al., "Generic Policy Decision Function Framework," Bell Labs Technical Journal 12(1), 123-129 (2007).

(Continued)

*Primary Examiner* — Charles Kim
*Assistant Examiner* — Cheryl M Schechtman
(74) *Attorney, Agent, or Firm* — Cantor Colburn LLP; Preston Young (57) ABSTRACT

A technique provides policy management within a policy-managed environment. A policy management agent retrieves a policy enforcement point (PEP) description from a PEP registry. The policy management agent utilizes the PEP description of the PEP to search a policy library to locate and determine matching (candidate) policies, and the matching policies match the policy description of the PEP. The managed environment, which incorporates policy evaluation, uses the equivalent policy matching criteria as the policy management agent.

20 Claims, 6 Drawing Sheets

OTHER PUBLICATIONS

Preda, S., et al., "Semantic Context Aware Security Policy Deployment," ASIACCS '09, Mar. 10-12, 2009, Sydney, NSW, Australia. Copyright 2009 ACM, pp. 251-261.

Salehie, M., et al., "Self-Adaptive Software: Landscape and Research Challenges," ACM Transactions on Autonomous and Adaptive Systems, vol. 4, No. 2, Article 14, Publication date: May 2009, pp. 1-42.

* cited by examiner

DISCOVERABLE APPLICABILITY OF DYNAMICALLY DEPLOYABLE SOFTWARE MODULES

GOVERNMENT RIGHTS

This invention was made with Government support under Contract No.: W911NF-06-3-0002 awarded by the U.S. Army. The Government has certain rights in this invention.

BACKGROUND

Exemplary embodiments relate to policy based management systems, and more specifically, to the discoverability of policy enforcement points in a managed environment.

There have been significant developments in the area of policy based computing. The development of policy based computing is expected to simplify and reduce the cost of system administration, while increasing the quality of service. Policy based computing allows an administrator to specify a set of rules to guide the operations of a computer system. The techniques of policy based computing are especially applicable to the area of autonomic computing.

Some examples of policies include a policy that would re-allocate storage and notify the user when specific performance requirements are not met, and a policy that specifies a specific type of service be assigned to a user with specific attributes, e.g. a user associated with a specific company or a specific Internet protocol (IP) address.

In the field of on-demand computing, policy management becomes an important element in managing the environment. In order to adaptively respond to changes in resource requirements it should be possible to change policies easily, effectively and rapidly, in response to changing conditions. These changing conditions can be viewed as being generated by, as non-limiting examples, changes in laws, rules or regulations in a particular country; an occurrence of an unforeseen event that can cause a ripple effect throughout a network of computers; or a data center experiencing a rapid up/down surge in requests for processing.

The typical practice in using policies is that policies are created first, and then applied against customer requirements specified in a contract. Once created, the policies are applied with the expectation that the environment can be controlled in meeting the customer requirements.

In general, in conventional practice the policy statements are static, meaning that once they are created and activated, they cannot be changed. If a policy change is required, based on changing business and/or environment conditions, it is necessary to create a new policy reflecting the desired change(s) and to then replace the prior, out-dated policy statement with the newly created policy statement. However, this can be a cumbersome and time consuming process, especially since the required policy change may be quite small, while the amount of effort needed to create the new policy, verify and activate it may be substantially greater.

BRIEF SUMMARY

According to an exemplary embodiment, a method is provided for policy management. A policy management agent retrieves a description of the PEP from the PEP registry. The policy management agent utilizes the description of the PEP to search a library to locate and determine matching policies, and the matching policies match the description of the PEP.

Additional features are realized through the techniques of the present disclosure. Other systems, methods, apparatus, devices, and/or computer program products according to other embodiments are described in detail herein and are considered a part of the claimed invention. For a better understanding of exemplary embodiments and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features of the present disclosure are apparent from the following detailed description taken in conjunction with the accompanying drawings in which:

DETAILED DESCRIPTION

Policy based environments require the deployment and/or activation of policies within a managed environment. The managed environment contains policy enforcement points (PEP) which request decisions from policy decision points (PDP). The PDPs in turn use the deployed policies to make their decision based on the run-time data provided by the PEP. The PDP typically examines the PEP's request, especially the runtime data, to identify which of the deployed policies should be used to process the requested decision request. If no policies are matched by the PDP, then the decision may be made in error. This means that the policies that are deployed may need to be selected based on which PEPs are present in the managed environment. To assist in this decision process, it is useful to know, apriori, which PEPs are present in the managed environment according to exemplary embodiments.

Exemplary embodiments provide the ability to register and discover the PEP in the managed environment and then allow policy deployment decisions to be made based on that registry information. Before being allowed to request decisions, the PEPs are required to register with the PDP, which then makes information about (registered) PEPs available to a policy management agent (PMA) that can assist in the selection of the policies to be deployed.

Figure 1:
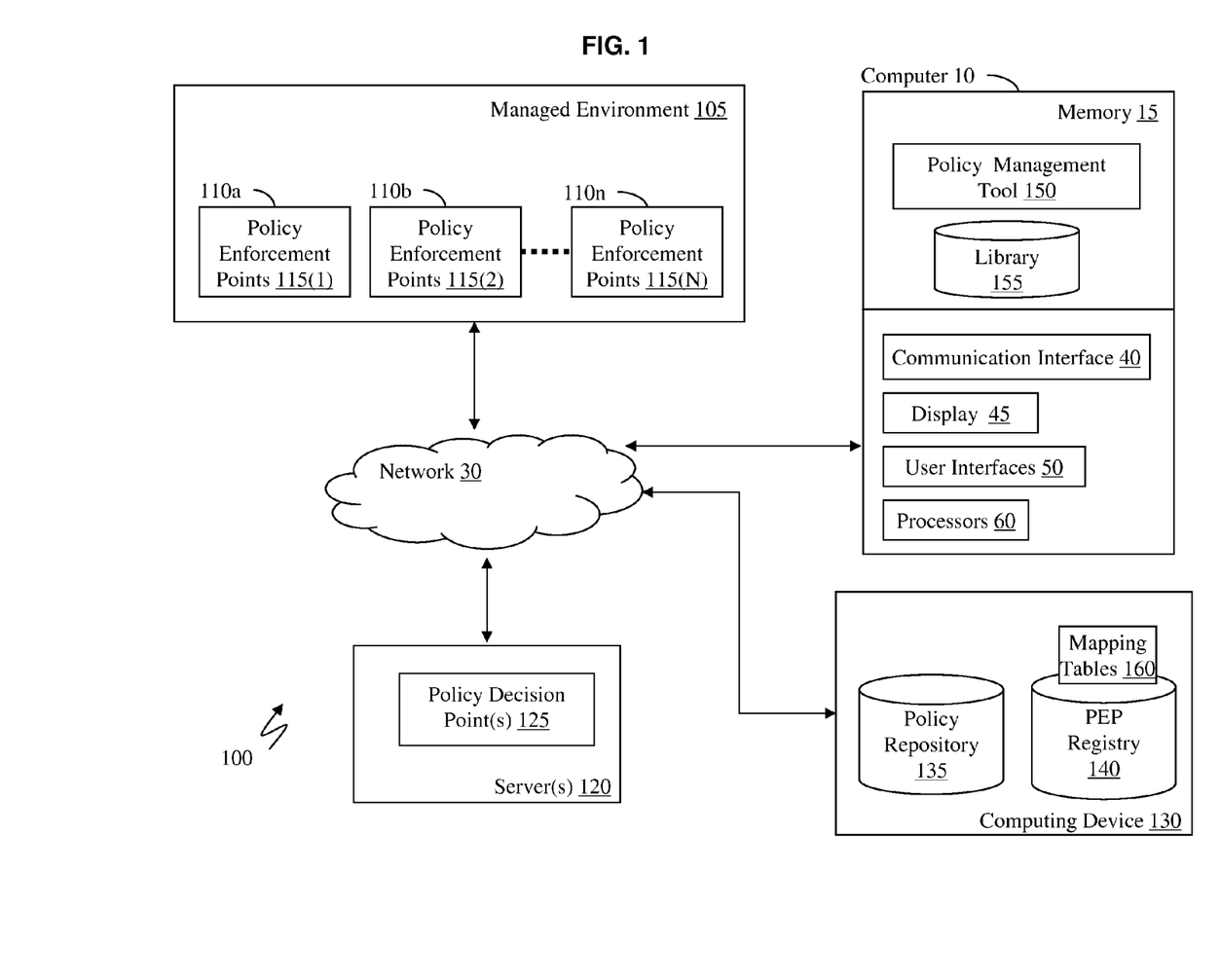
FIG. 1 illustrates a block diagram of a policy management architecture in accordance with exemplary embodiments

Now turning to FIG. 1, FIG. 1 illustrates a block diagram of a policy management architecture 100 in accordance with exemplary embodiments. The policy management architecture 100 includes a managed environment 105 comprising numerous policy enforcement points (PEPs) 115(1-N), which will be collectively referred to as policy enforcement points 115 unless a particular policy enforcement point (such as PEP 115(1)) is individually identified. The PEPs 115 may be stored on and/or relate to numerous elements 110(a-n), which will be collectively referred to as elements 110 unless a particular element (such as the element 110a) is individually identified. The elements 110 may include but are not limited to communication devices, sensors (including video, audio, motion, chemical, biological, etc.), computers, servers, devices, and so forth.

The managed environment 105 is a platform (such as a set of configurable software elements) that requires the dynamic configuration and deployment of decision making. Dynamic configuration and deployment of decision making might include the ability to change how a network firewall is configured, who has access to a file system, and/or to downgrade information for a specific user. Although the managed environment 105 is illustrated as a single box for conciseness, managed environment 105 is not meant to be limited to a single area or location. The managed environment 105 may include hardware and software elements distributed across countless miles, such as in the air, in the sea, on land, and/or in and beyond the earth's atmosphere.

Each policy enforcement point (PEP) 115 is a point in the managed environment 105 that needs to have a decision made, for example, to decide whether access to a secured resource should be granted. The PEP 115 requests the answer to this decision from the policy decision point (e.g., the policy decision point 125 discussed below). One implements such points (in which one or more decisions need to be made) in the managed environment as PEPs 115 instead of a hard-coded decision so that the decisions can be configured flexibly and dynamically with the policy. There may be any number of PEPs 115 in the managed environment 105. Also, within an individual element 110a, the PEP 115(1) may include multiple PEPs 115(1), such as a PEP for a firewall, a PEP that determines whether the resolution of an image should be reduced, a PEP that grants access to a database, etc.

The policy architecture 100 includes policy decision points 125. The policy decision points 125 represent numerous policy decision points, which can be located anywhere in the policy architecture 100. For explanation purposes, the policy decision points 125 may be present in one or more servers 120. The policy decision point (PDP) 125 provides for the execution of policies and returns results of the execution (e.g., an access rights decision) to the PEP 115 for action based on the decision (to allow or deny access to, e.g., a database). The PDP 125 decides which policies in the policy repository (discussed below) apply to the decision request.

A policy repository 135 and a PEP registry 140 are also included in the policy architecture 100. The policy repository 135 holds the policies that are available for execution by the PDP 125 during run-time. Policies may be activated and/or deactivated within the policy repository 135 by a policy management agent (discussed below).

Although either one and/or both the policy repository 135 and the PEP registry 140 may be co-located with the policy decision points 125 (e.g., on the server 120), for explanation purposes, the policy repository 135 and the PEP registry 140 are illustrated on a computing device 130. It is understood that both the policy repository 135 and the PEP registry 140 may be stored on separate computing devices 130 or distributed across one or more such computing devices 130.

The policy management architecture 100 may include one or more computers 10. The computer 10 may include memory 15, which may be a computer readable storage medium. A policy management agent 150 may reside on and/or be coupled to the memory 15, and the policy management agent 150 comprises logic and software components to operate and function in accordance with exemplary embodiments in the form of computer executable instructions. The policy management agent (PMA) 105 comprises one or more applications that manage and/or allows one to manage policies available to the PDP 125 by controlling the contents of the policy repository 135 and the activation state of the policies contained therein. Policy analysis (such as determining conflicts, coverage, etc) may be provided by the PMA 150 to assure proper and/or optimal policy deployments. In accordance with exemplary embodiments, various functions and operations discussed herein may be automatically performed by computer executable instructions of the PMA 150. Also, a user (such as an operator or administrator) may utilize the PMA 150 to perform the various functions and operations. For example, the policy management agent 150 may be coupled to and/or may include a graphical user interface (GUI). It is understood that all of the functions and operations of the PMA 150 may be completely automated and/or any portion may be accomplished with user intervention.

The computer 10 includes and/or is coupled to a library 155, which is a library of all policies. A policy in the library 155 is a dynamically deployable software component for execution within the managed environment 105. Policies are typically used for authorization, data filtering, and/or control operations within the managed environment 105. For example, a policy may be a logical condition that says based on this condition being true perform a certain action, and based on this condition being false perform a different action. Evaluation by the policy decision point 125 is done over a set of instance data provided by (a PEP 115 in) the managed environment 105. The Simple Policy Language (SPL) defines a specific representation of policies and uses a standard format for condition specification and specification of an action to execute when the condition evaluates to true.

The computer 10, elements 110 (details not illustrated for clarity), servers 120 (details not illustrated for clarity), computing device 130 (details not illustrated for clarity) may each include and/or be coupled to a communication interface 40, display 45, user interfaces 50, processors 60, memory, and software for operating as discussed herein, as understood by one skilled in the art. Further details are discussed with reference to FIG. 5.

The communication interface 40 comprises hardware and software for communicating over the network 30. The user interfaces 50 may include, e.g., a track ball, mouse, keyboard, point device, touch screen, etc.

Furthermore, exemplary embodiments are not limited to but are capable of being implemented in the architecture 100 illustrated in FIG. 1. Additionally, the server 120 may be representative of numerous servers. The policy repository 135 and PEP registry 140 may be representative of numerous storages element (devices). The computer 10 may be representative of numerous computers. The managed environment 105 may be representative of numerous managed environments. Likewise, the network 30 may be representative of numerous networks. Therefore, the architecture 100 illustrated in FIG. 1 is neither limited numerically to the elements depicted therein nor limited to the exact configuration and operative connections of elements. Further, it is understood by those skilled in the art that elements may be added to, subtracted from, or substituted for the elements described in the architecture 100 of FIG. 1.

More regarding the network 30, the network 30 may include circuit-switched and/or packet-switched technologies and devices, such as routers, switches, hubs, gateways, etc., for facilitating communication in the architecture 100. The network 30 may include wireline and/or wireless components utilizing, e.g., IEEE 802.11 standards for providing over-the-air transmissions of communications. The network 30 can be IP-based networks for communication between a customer service center and clients/users via a broadband connection. Also, the network 30 may include wireline and/or wireless components utilizing standards for, e.g., multimedia messaging services (MMS). The network 30 may include a multimedia messaging center (MMC), which implements the network side of multimedia messaging service (MMS) and makes it possible for an operator to offer multimedia messaging to mobile communication device users. According to exemplary embodiments, the network 130 facilitates transmission of media (e.g., images, video, data, multimedia messaging, etc.) through a various connections. The network 30 may be implemented in a wireless fashion, e.g., using wireless protocols and technologies, such as such as Wi-Fi®, WiMAX™, Bluetooth®, etc. The network 30 can also be a packet-switched network, such as a local area network, a wide area network, a metropolitan area network, an Internet network, or other similar types of networks. The network 30 may be a cellular communications network, a fixed wireless network, a wireless local area network (LAN), a wireless wide area network (WAN), a personal area network (PAN), a virtual private network (VPN), an intranet or any other suitable network, and the network 30 may each include equipment for receiving and transmitting signals, such as a cell tower, a mobile switching center, a base station, a wireless access point, and the like.

Exemplary embodiments are configured to allow the PMA 150 to discover the PEPs 115 that may request decisions from the PDP 125. To support discovery of the PEPs 115 in respective elements 110, each PEP 115 "registers" with the PDP 125 before being allowed to request decisions from the PDP 125. The PDP 125 then places a description of the PEP 115 in the PEP repository 135 that is made available to the PMA 150. For example, when the PDP 125 registers the PEPs 115, the PDP 125 may create a mapping table 160 in the PEP registry 140 for each registered PEP 115 in the managed environment 105. The mapping table 160 contains information about each registered PEP 115.

An example is now provided for one PEP 115 but applies to all the PEPs 115. For example, PEP 115(1) of element 110a may register with the PDP 125, and the PEP 115(1) provides its name, class, instance information, attributes, and PEP type to the PDP 125 and/or the PDP extracts the same from the PEP 115(1). The PEP 115 deregisters when done. Each PEP 115 may have its own individual mapping table 160. The PDP 125 creates a mapping table 160 for the PEP 115(1) and records this PEP information (for PEP 115(1)) in the mapping table 160. In the mapping table 160, the PDP 125 records the name, runtime instance information (data types to be provided at decision request time), attributes, date the PEP 115 came online, and PEP type for the PEP 115. For example, a PEP 115 may provide a Java object of type Date to the policy decision request. This Date object is (an example of) the runtime data for which type information is provided and recorded at PEP registration time. In addition, a PEP 115 may have 0 or more attributes. For example, an attribute with a name of 'class' and a value of 'firewall' could be used to classify the PEPs and policies.

The PDP 125 assigns the PEP 115(1) an identification (ID) code (such as an alphanumeric code) and adds the PEP ID code to the mapping table 160 for the PEP 115(1). The mapping table 160 for the PEP 115(1) is stored in the PEP registry 140. This same registration process occurs for each PEP 115 in the managed environment 105.

The PDP 125 exposes PEP information (including the name, class, instance information, attributes, PEP type, PEP ID) in the mapping table 160 of the PEP repository 140 for discovery by the PMA 150.

The PMA 150 is configured to provide policy management of the PEPs 115 in the managed environment 105. The PMA 150 (as an automated process and/or operated by a user) is configured to author and analyze policies, and the PMA 150 can add, activate, deactivate, and delete PEPs 115 in the managed environment 105 as well as add, activate, deactivate, and delete polices for PEPs 115. Policies can be targeted (and applied) to any PEP 115 by the PMA 150.

During runtime, when the PEP 115 calls (requests) for decisions from the PDP 125, the PEP 115 provides its PEP name, type, and instances information to the PDP 125. The PDP 125 receives the PEP information (PEP name, type, and instance information) and locates the matching polices in the policy repository 135 that match the PEP information of the requesting PEP 115. Additionally and/or alternatively, the PDP 115 can retrieve the PEP's information from the PEP registry 140, and if the requesting PEP 115 has not registered in advance, the PDP 125 can reject the decision request by the PDP 115. The PDP 125 evaluates the policy (or policies) that correspond to the requesting PEP 115, such as evaluating, e.g., an obligation or access control list (ACL). Based on the evaluation, the PDP 125 returns a decision back to the PEP 115.

Further with regard to PEP registry by the PEPs 115 to the PDP 125, the registered PEPs 115 are discoverable by the PMA 150. In exemplary embodiments, the combination of the PEP discovery by the PMA 150 and the PMA's 150 ability to identify applicable policies (in the library 155) for the discovered PEPs 115 enables the PMA 150 to provide a display of each PEP 115 coupled to its corresponding policies, e.g., in a table.

Both the PEP 115 (such as the PEP 115(1)) and the policies in the library 155 have associated meta-data including, PEP type (i.e., authorization or obligation), attributes (name/value pairs) and description of the runtime instance data that will be provided by the PEP 115 at the time a decision is requested. This PEP information for the PEP 115(1) is stored in the table 160. The runtime instance information is a) made available by the PEP 115(1) (during, e.g., registration with the PDP 125) and b) defines the data that will be made available to the policy. The PMA 150 is configured to search for and locate (descriptions) of registered PEPs 115 in the PEP registry 140, and find matching (corresponding) policies in the library 155. For example, after the PMA 150 has discovered (searched and located) the PEP 115(1) (and its PEP information in the table 160), the PMA 150 searches through the library 155 for policies that match the PEP information of the PEP 115(1). For example, the policies and their metadata are examined and matched with PEP 115(1) and its metadata (i.e., PEP information) by the PMA 150. The PMA 150 can match each individual PEP 115(1) with its corresponding policies that apply to the PEP 115(1) in the library 155, and the PMA 150 copies the 0 or more corresponding polices from the library 155 into the policy repository 135 (to be utilized by the PDP 125 during runtime of the PEP(1)). Although the example referred to a particular PEP 115, it is understood that the example is not meant to be limited to a single PEP 115 but is for all PEPs 115.

In exemplary embodiments, there are two types of matching discussed. One is during runtime in which the PDP 125 matches policies from the policy repository 135 to a requesting PEP 115; the PDP 125 evaluates each policy and returns a result to the requesting PEP 115. The result transmitted to the PEP 115 by the PDP 125 may be that a person is given authorization to a file system based on the PDP's 125 evaluation of the policy. The other type of matching is when the PMA 150 discovers PEPs 115 from the PEP registry 140 and then matches policies from the library 155 to the PEPs 115 for policy management.

In exemplary embodiments, one PEP 115 may be matched with a few policies, numerous policies, and/or no polices by the PMA 150. In accordance with exemplary embodiments, matching the policies (along with their metadata) in the library 155 to the PEP 115 (along with its metadata) by the PMA 150 can be accomplished in any number of ways, including the following:

1) The PMA 150 is configured to match the policy types of the policies against the PEP type (such as firewall) of the PEPs 115. If the PEP type is unspecified, then the PEP 115 will be considered as matching any policy type (by the PMA 150), otherwise the PEP type and policy type must be the same.

2) The PMA 150 is configured to look for policies in the library 155 that can be evaluated using the instances (of the PEP 115) described in the mapping table 160. The PMA 150 confirms that both instance names and classes match for the PEP 115 and the policy, although a class in the instance mapping table 160 may be a subclass of that referenced in the policy. The mapping table 160 for the PEP 115 may provide more than the instances required by a given policy, and the PMA 150 still recognizes this as a match (as shown in view 404 of FIG. 4). For example, a PEP 115 may be described as providing an instance of a Java ArrayList class and a Java Properties class. A policy that expects only a Java List class, which is a super class of ArrayList, can be matched with this PEP 115. The policy need not use (or require) the Properties object that is provided by the PEP 115.

3) The PMA 150 is configured to determine if there are attributes on the policy in the library 155. When there are attributes on the policy, the PMA 150 determines if the attributes on the policy match the attributes provided during registration of PEP 115 and contained in the PEP information stored in the map 160. A match is determined by the PMA 150 when the attributes in common on the policy and the PEP 115 have the same values.

The matching by the PMA 150 may result in zero or more policies for any given PEP 115. For the PEP 115, the PMA 150 is configured to display (via the display 45) this list of policy matches to the end user and allow the agent to select which policies should be deployed for PEP 115. Alternatively and/or additionally, for the PEP 115, the PMA 150 is configured to parse the list of policy matches itself and select based on predefined criteria which policies should be deployed for the PEP 115. For the policies selected by the user and/or selected by the PMA 150 for the particular PEP 115, the PMA 150 copies the selected policies from the library 155 to the policy repository 135.

Additionally (optionally), as part of the PEP registration process, a PEP 115 might provide to the PDP 125 that the PEP 115 intends to register with a set of pre-specified attributes (metadata) that includes information regarding the expected load of policy evaluation requests that the PEP 115 estimates (and/or knows in advance) that it will submit to the PDP 125. Such specified attributes and expected policy load evaluation requests information includes (but is not limited to) the total number of policy evaluation requests, their peak and/or average rate, the inter-request time, and any other information that can characterize the policy evaluation request load. The PDP 125 is configured to in turn use this metadata, in conjunction with other information that the PDP 125 keeps including (but not limited to) the number of existing PEPs 115 already registered, current load of policy evaluation requests that it (the PDP 125) is serving, expected request load from the other registered PEPs 115, processing and bandwidth capacity that the PDP 125 has, etc., to make a decision on whether to accept the new PEP 115 and designate it as discoverable, so as to execute policy evaluations on the new PEP's behalf. The logic and computer executable instructions for making this decision (and other actions) are embodied in the PDP 125 of the server 102. In case the PDP 125 cannot accept the request for registration by the new PEP 115 (because of the expected new load and/or the current load of the PDP 125), the PDP 125 can optionally provide a return code in the reply that the PDP 125 sends back to the new PEP 115 that signifies the reason, so as to allow the PEP 115 to either decrease its load requirements, and/or assist the PEP 115 in choosing another PDP 125 for registration.

Figure 2:
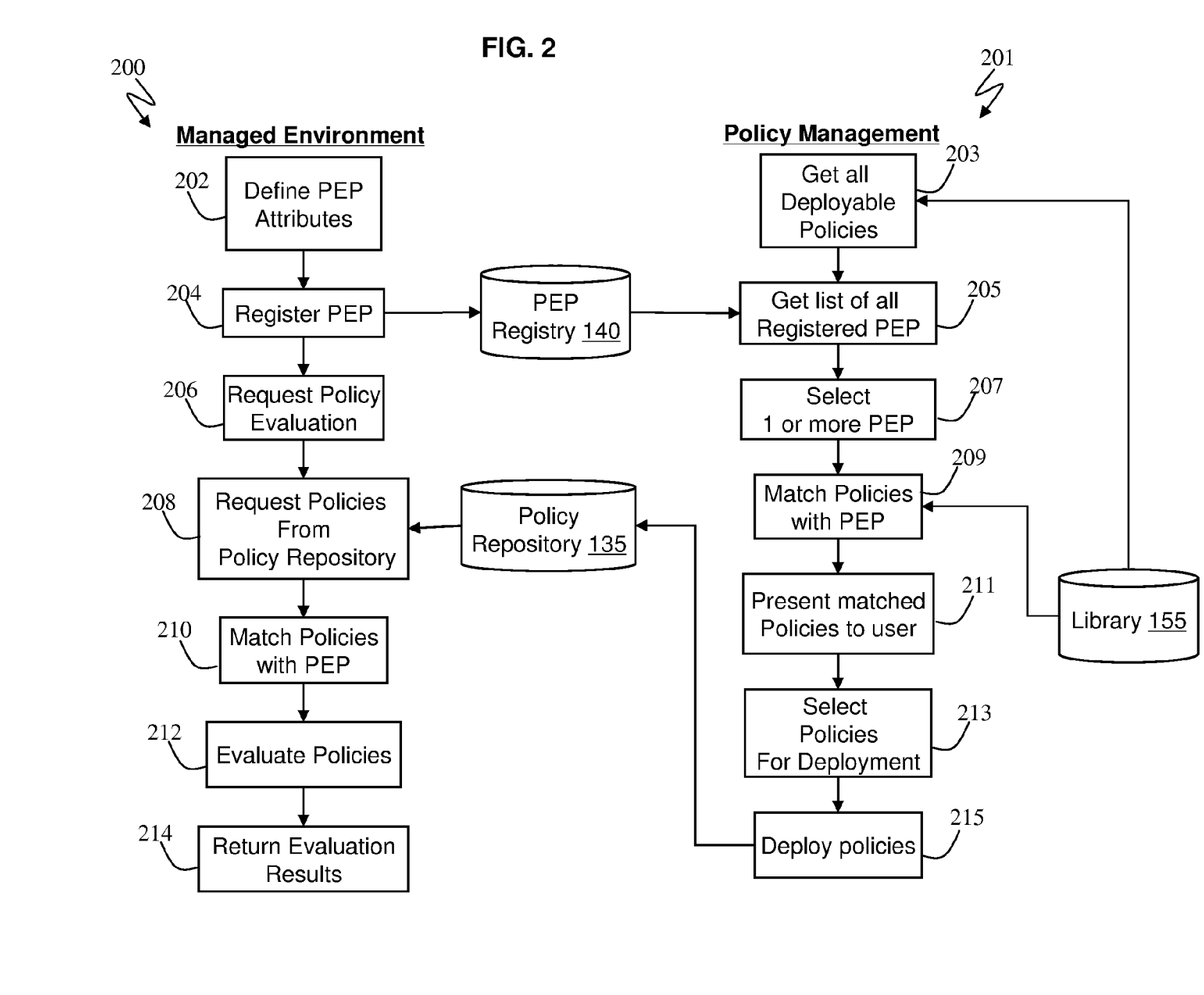
FIG. 2 illustrates an example of a process for a managed environment and a process for policy management in accordance with exemplary embodiments.

FIG. 2 illustrates an example of a process 200 for the managed environment 105 and a process 201 for policy management in accordance with exemplary embodiments.

In the runtime process 200, each PEP 115 is defined, e.g., by utilizing the PMA 150 at operation 202.

Each PEP 115 is configured to register with the PDP 125 at operation 204. The PDP 125 receives (extracts) the PEP information, creates the mapping table 160 for the PEP 115, and records the PEP information (as discussed herein) in the mapping table 160 of the PEP registry 140.

When a function of the element 110 (reaches) the PEP 115 during runtime and the PEP 115 is executed, the PEP 115 requests a policy evaluation to the PDP 125 at operation 206.

The PDP 125 requests policies from the policy repository 135 at operation 208.

The PDP 125 matches the policies from the policy repository 135 to the requesting PEP 115 at operation 210. For example, this may be a set of policies deployed by the PMA 150.

The PDP 125 evaluates each policy that has been matched (i.e., that applies) to the requesting PEP 115 at operation 212.

Based on the evaluation, the PDP 125 returns (transmits) the evaluation results to the requesting PEP 115 at operation 214. Accordingly, the PEP 115 on the element 110 may, e.g., deny (or allow) access to a file system based on the result from the PDP 125.

Further, in the policy management process 201, the PMA 150 is configured to (search and) retrieve all deployable polices from the library 155 at operation 203.

The PMA 150 is configured to retrieve a list of all registered PEPs 115 at operation 205. The PMA 150 displays on the display 45 the list of all registered PEPs 115 to the user via a GUI. Also, the PMA 150 may filter the list of registered PEPs 115 by, e.g., date of coming online, policy type (e.g., firewall), location of the element 110, etc., and the user may request that the PMA 150 filters the list of registered PEPs 115 by the same.

Utilizing the PMA 150, the user and/or the PMA 150 can select 1 or more PEPs 115 from list of registered PEPs 115 for the PMA 150 to execute policy management at operation 207.

For each selected PEP 115 received by the PMA 150, the PMA 150 matches the polices in the library 155 to the selected PEPs 115 respectively at operation 209. For example, the PMA 150 retrieves the PEP information from the mapping table 160 for the selected PEP 115, and utilizes this information to search the policy information of the polices in the library 155 to find a match.

The PMA 150 displays in the display 45 the matched policies for each selected PEP 115 to the user at operation 211. Additionally and/or alternatively, the PMA 150 may parse the matched policies for each selected PEP 115 to determine which policies to select for deployment.

For each selected PEP 115, the PMA 150 receives a selection of the policies for deployment at operation 213. The selection of the policies for deployment may be made via the user interface 50 by the user. Additionally and/or alternatively, in response to parsing the matched policies, the PMA 150 may select the policies for deployment based on predefined criteria.

The PMA 150 deploys the policies in the policy repository 135 to be utilized by the PDP 125 at operation 215. For example, the PMA 150 is configured to copy the policies (from the library 155 to the policy repository 135) that have been selected by the user for each PEP 115.

Figure 3:
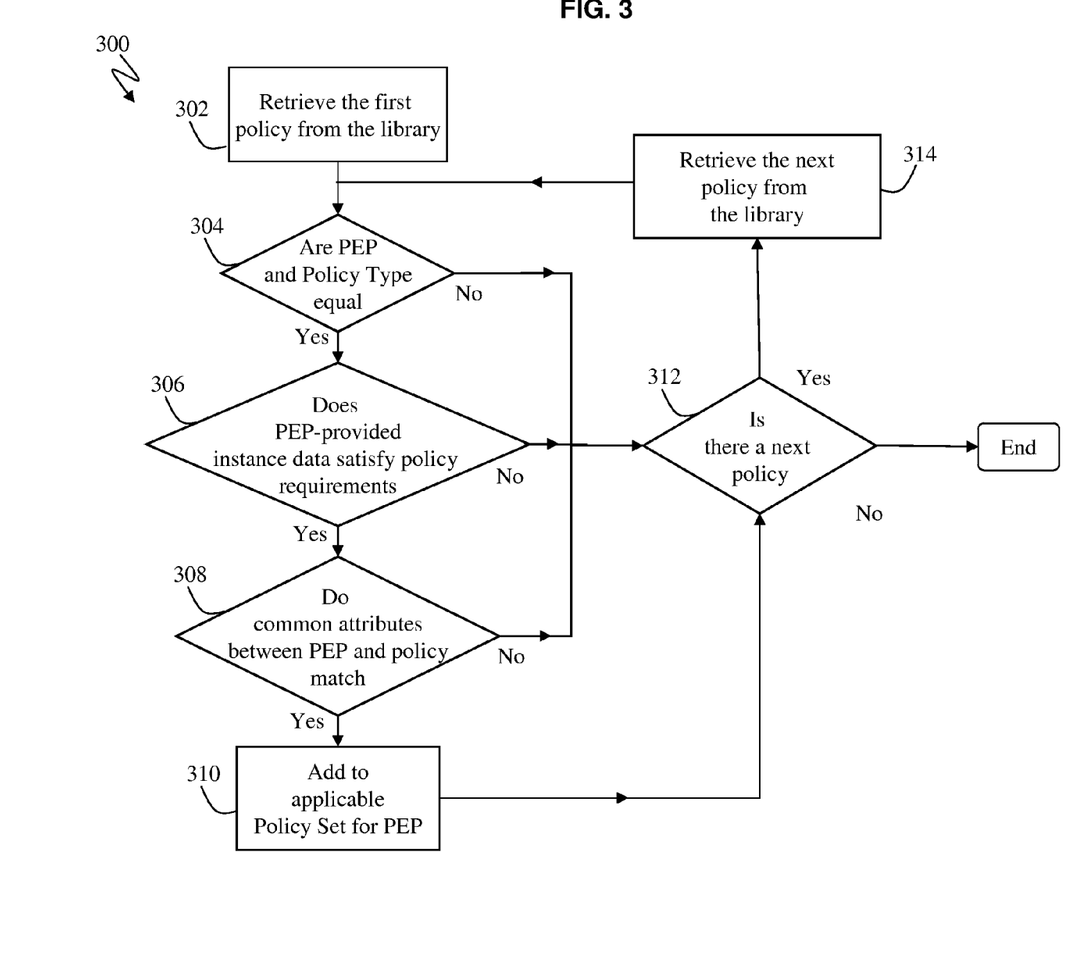
FIG. 3 illustrates an example of a process for matching policies with policy execution points by a policy management agent in accordance with exemplary embodiments.

FIG. 3 illustrates an example process 300 for matching policies with PEPs 115 by the PMA 150 in accordance with exemplary embodiments. For a single PEP 115 (and any subsequent PEPs 115), the process 300 is repeated for each policy in the library 155.

For a PEP 115, the PMA 150 accesses the library 155 and retrieves a first policy from the library 155 at operation 302.

The PMA 150 determines whether a policy type of the policy matches (equals) a PEP type of the PEP 115 at operation 304. If there is no policy match, the PMA 150 proceeds to operation 312.

If the policy type and the PEP type match, the PMA 150 determines whether the instance data of the PEP 115 satisfies the instance data requirements of the policy at operation 306. For example, a policy that requires a Java List type instance is satisfied by a PEP that provides a Java ArrayList type instance, because an ArrayList is an implementation of the Java List interface type.

If the instance data of the PEP 115 does not satisfy the policy requirements, the PMA 150 proceeds to operation 312.

If the instance data of the PEP 115 does satisfy the policy requirements, the PMA 150 determines whether the common attributes between the PEP 115 and the policy match at operation 308.

If the common attributes between the PEP 115 and the policy do not match, the PMA 150 proceeds to operation 312.

If the common attributes between the PEP 115 and the policy do match, the PMA 150 adds this (particular) policy to the policy set for this PEP 115 at operation 310.

The PMA 150 determines whether there is another policy in the library 155 to analyze for the PEP 115 at operation 312.

If there is not another policy to analyze, the PMA 150 ends the process.

If the is another policy, the PMA 150 retrieves the next policy at operation 314. The PMA 150 continues analyzing policies for the PEP 115 (and adding applicable polices to the policy set for this PEP 115, until there are no more policies to analyze). When the PMA 150 is finished add policies to the policy set for this PEP 115, the PMA 115 deploys the police set to the policy repository 135. The process 300 moves to another PEP 115.

Figure 4:
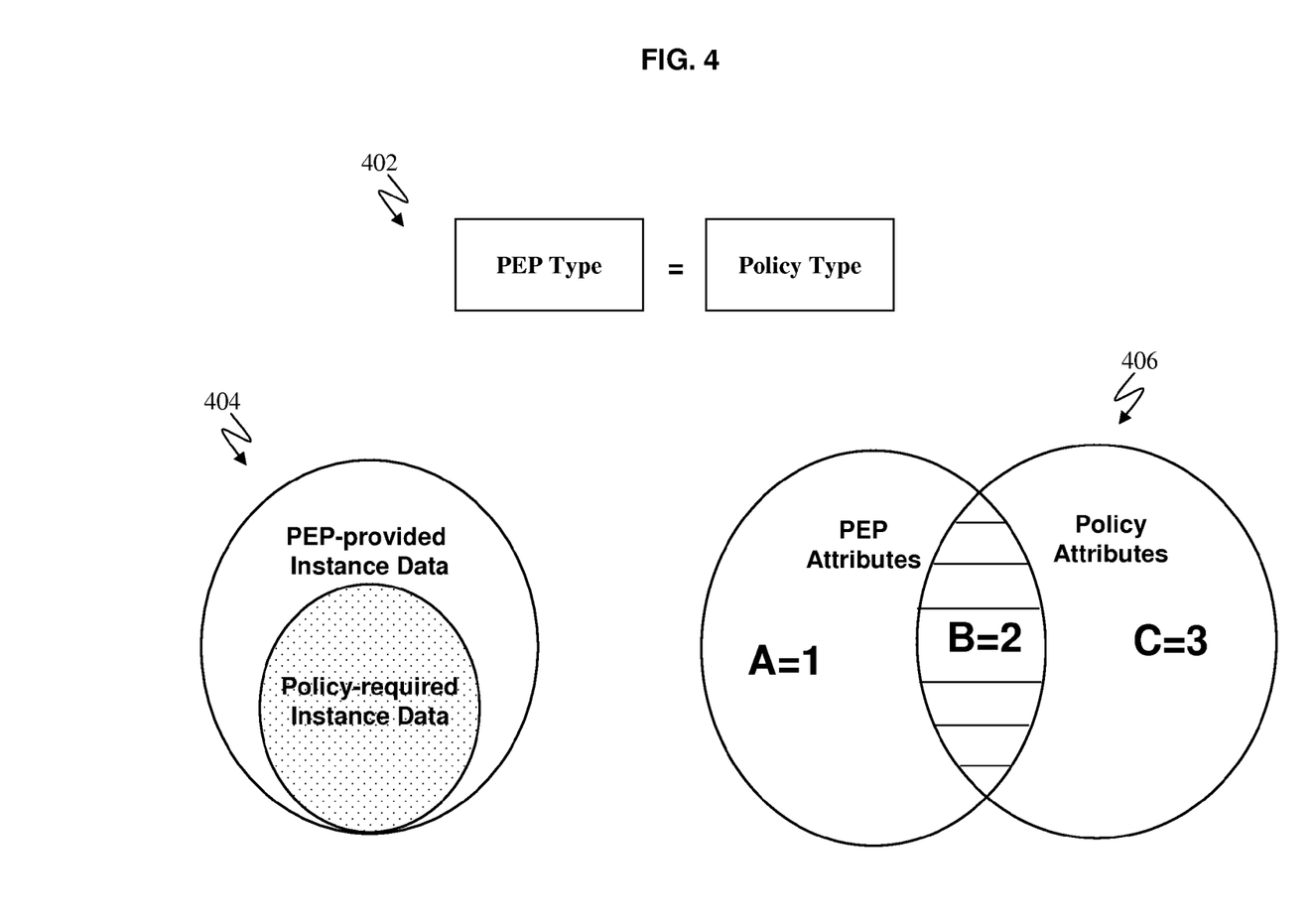
FIG. 4 illustrates a pictorial representation of matching a policy execution point (PEP) with a policy in accordance with exemplary embodiments.

FIG. 4 illustrates a pictorial representation of matching metadata (PEP information/descriptions) of the PEPs 115 to metadata (policy information) of a policy in accordance with exemplary embodiments.

View 402 depicts an example of the PMA 150 determining and matching the PEP type of the PEP 115 to the policy type of a policy in the library 155. As seen in the view 402, the PEP type matches the policy type.

View 404 depicts an example of the PMA 150 determining and matching the PEP instance data to the policy required instance data for the PEP 115. For example, the PMA 150 determines that PEP instance data provided during PEP registration satisfies the instance data requirements for this particular policy as shown in the Venn diagram.

View 406 depicts an example of the PMA 150 finding the common PEP attributes and policy attributes between the PEP 115 and the policy (being analyzed). The PMA 150 determines whether the value of common (i.e., same) PEP attributes and policy attributes are equal (match). As seen in the view 406, the PMA 150 has determined that B=2 (shaded area shown in the Venn diagram) are the common and equal attributes between the PEP attributes and the policy attributes, and accordingly, the common PEP attributes and common policy attributes match.

FIG. 4 illustrates an example for a particular policy being matched to a particular PEP 115 (such as PEP 115(1)) by the PMA 150. The PMA 150 parses through all the policies (and/or new policies since last policy management update) in the library 155 for the particular PEP 115 until all matching policies have been determined. The PMA 150 would then proceed to determine and find policy matches for the other PEPs 115 (such as the PEP 115(2) and PEP 115(3)), until all policy matches are respectively determined for these PEPs (PEP 115(1), PEP 115(2), and PEP 115(3)).

Figure 5:
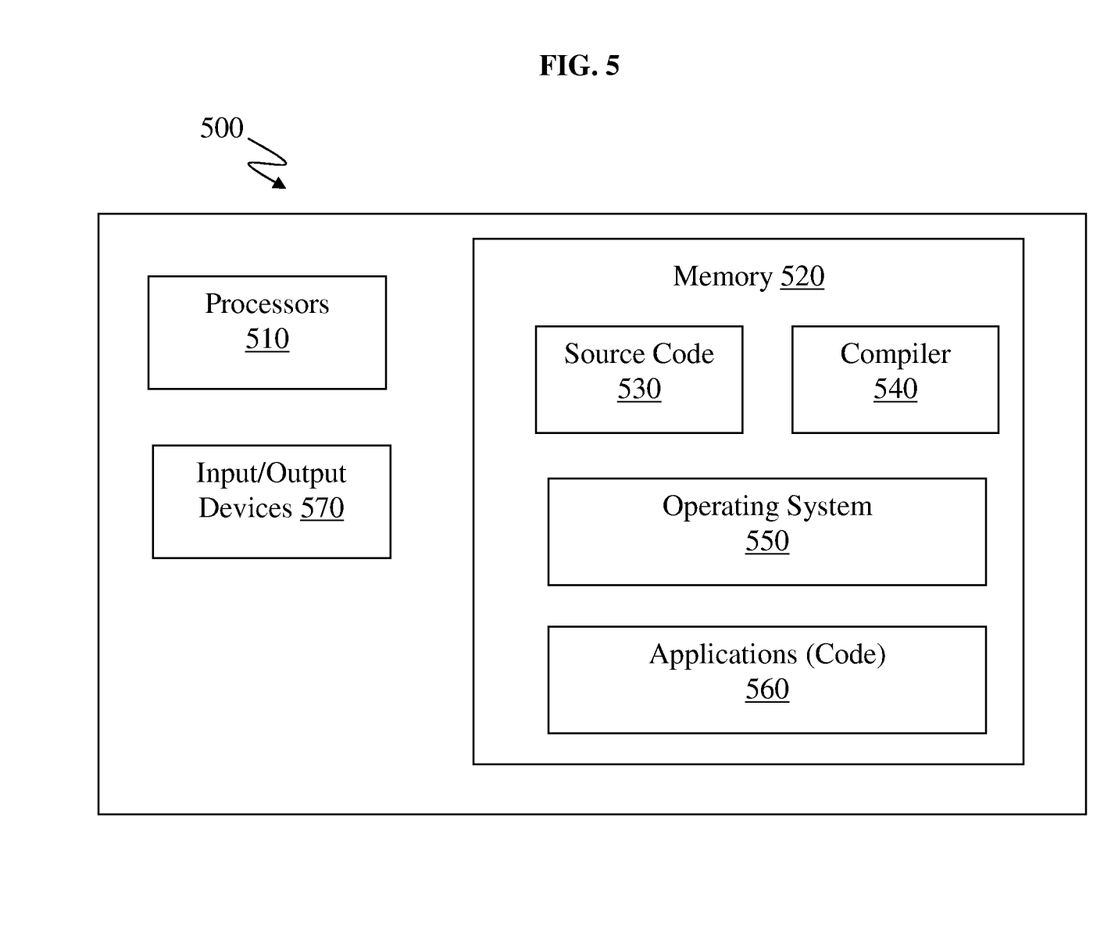
FIG. 5 illustrates an example of a computer having capabilities, which may be included in exemplary embodiments.

FIG. 5 illustrates an example of a computer 500 having capabilities, which may be included in exemplary embodiments. Various methods, procedures, modules, processes, operations, flow diagrams, and techniques discussed herein may also incorporate and/or utilize the capabilities of the computer 500. Moreover, capabilities of the computer 500 may be utilized to implement features exemplary embodiments discussed herein or shown in the FIGS. One or more of the capabilities of the computer 500 may be implemented in any element discussed herein.

Generally, in terms of hardware architecture, the computer 500 may include one or more processors 510, computer readable storage memory 520, and one or more input and/or output (I/O) devices 570 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 510 is a hardware device for executing software that can be stored in the memory 520. The processor 510 can be virtually any custom made or commercially available processor, a central processing unit (CPU), a data signal processor (DSP), or an auxiliary processor among several processors associated with the computer 500, and the processor 510 may be a semiconductor based microprocessor (in the form of a microchip) or a macroprocessor.

The computer readable memory 520 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 520 may incorporate electronic, magnetic, optical, and/or other types of storage media. Note that the memory 520 can have a distributed architecture, where various components are situated remote from one another, but can be accessed by the processor 510.

The software in the computer readable memory 520 may include one or more separate programs, each of which comprises an ordered listing of executable instructions for implementing logical functions. The software in the memory 520 includes a suitable operating system (O/S) 550, compiler 540, source code 530, and one or more applications 160 of the exemplary embodiments. As illustrated, the application 560 comprises numerous functional components for implementing the features, processes, methods, functions, and operations of the exemplary embodiments. The application 560 of the computer 500 may represent numerous applications, agents, software components, modules, interfaces, controllers, etc., as discussed herein but the application 560 is not meant to be a limitation.

The operating system 550 may control the execution of other computer programs, and provides scheduling, input-output control, file and data management, memory management, and communication control and related services.

The application(s) 560 may employ a service-oriented architecture, which may be a collection of services that communicate with each. Also, the service-oriented architecture allows two or more services to coordinate and/or perform activities (e.g., on behalf of one another). Each interaction between services can be self-contained and loosely coupled, so that each interaction is independent of any other interaction.

Further, the application 560 may be a source program, executable program (object code), script, or any other entity comprising a set of instructions to be performed. When a source program, then the program is usually translated via a compiler (such as the compiler 540), assembler, interpreter, or the like, which may or may not be included within the memory 520, so as to operate properly in connection with the O/S 550. Furthermore, the application 560 can be written as (a) an object oriented programming language, which has classes of data and methods, or (b) a procedure programming language, which has routines, subroutines, and/or functions.

The I/O devices 570 may include input devices (or peripherals) such as, for example but not limited to, a mouse, keyboard, scanner, microphone, camera, etc. Furthermore, the I/O devices 570 may also include output devices (or peripherals), for example but not limited to, a printer, display, etc. Finally, the I/O devices 570 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 570 also include components for communicating over various networks, such as the Internet or an intranet. The I/O devices 570 may be connected to and/or communicate with the processor 510 utilizing Bluetooth connections and cables (via, e.g., Universal Serial Bus (USB) ports, serial ports, parallel ports, FireWire, HDMI (High-Definition Multimedia Interface), etc.).

When the computer 500 is in operation, the processor 510 is configured to execute software stored within the memory 520, to communicate data to and from the memory 520, and to generally control operations of the computer 500 pursuant to the software. The application 560 and the O/S 550 are read, in whole or in part, by the processor 510, perhaps buffered within the processor 510, and then executed.

When the application 560 is implemented in software it should be noted that the application 560 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 560 can be embodied in any computer-readable medium 520 for use by or in connection with an instruction execution system, apparatus, server, or device, such as a computer-based system, processor-containing system, or other system that can fetch the instructions from the instruction execution system, apparatus, or device and execute the instructions. In the context of this document, a "computer-readable storage medium" can be any means that can store, read, write, communicate, or transport the program for use by or in connection with the instruction execution system, apparatus, or device. The computer readable medium can be, for example but not limited to, an electronic, magnetic, optical, or semiconductor system, apparatus, or device.

More specific examples (a nonexhaustive list) of the computer-readable medium 520 would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 560 is implemented in hardware, the application 560 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is understood that the computer 500 includes non-limiting examples of software and hardware components that may be included in various devices, servers, and systems discussed herein, and it is understood that additional software and hardware components may be included in the various devices and systems discussed in exemplary embodiments.

Figure 6:
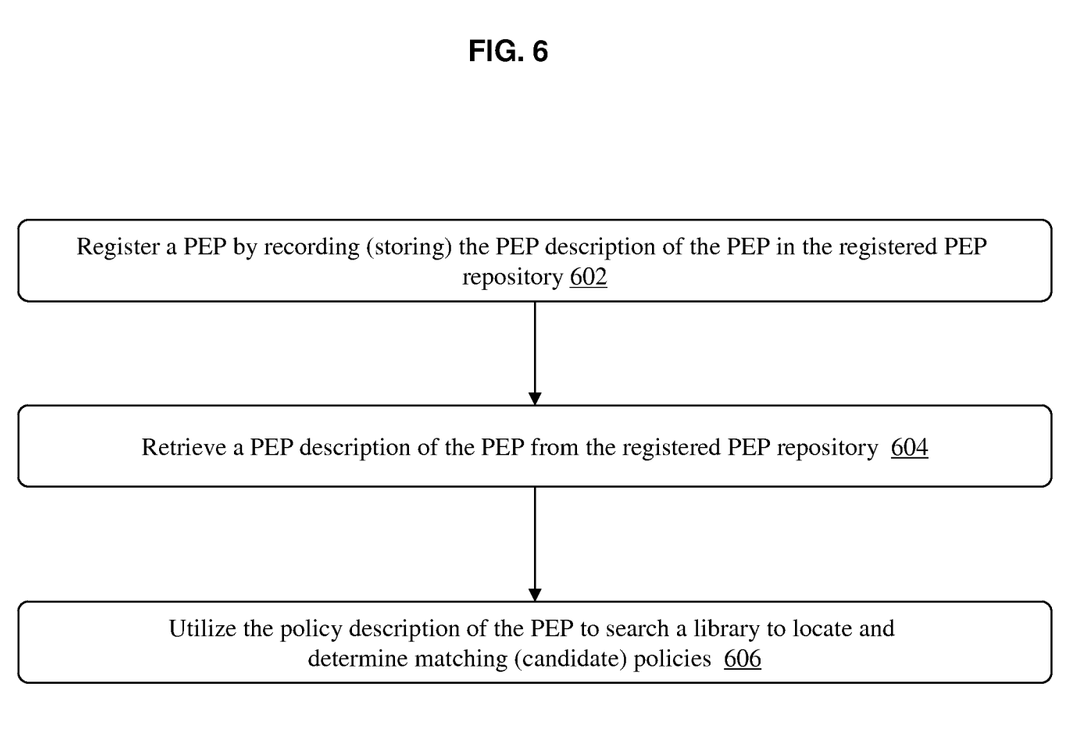
FIG. 6 illustrates a method in accordance with exemplary embodiments.

FIG. 6 illustrates a method 600 in accordance with exemplary embodiments.

The PDP 125 is configured to register a PEP 115 by recording (storing) the PEP description of the PEP 115 in the PEP registry 140 at operation 602. The PEP description is the PEP information stored in the mapping table 160 for that particular PEP 115, and the PEP description contains all the information (metadata) about the PEP 115. In some exemplary embodiments, the PMA 150 may be configured to register PEPs 115 as discussed for the PDP 125.

The policy management agent 150 is configured to retrieve the PEP description of the PEP 115 from the PEP registry 140 at operation 604. The user may direct (via the user interface 50) the PMA 150 to retrieve PEP descriptions for PEPs 115, and/or the PMA 150 may automatically select which PEP descriptions of PEPs 115 to retrieve. For example, by user direction and/or automatically by the PMA 150, the PMA 150 may query (and retrieve) PEP descriptions of PEPs 115 that did not have any policies, may select (update) PEP descriptions of PEPs 115 based on when the PEPs 115 came online (when the PEP 115 came online is stored in the PEP information in the mapping table 160), and/or may select PEP descriptions for PEPs 115 by a category (such as select all firewalls, cameras, etc.). Also, the PMA 150 may retrieve PEP descriptions of PEPs 115 based on a given range of dates (automatically generated and/or provided by the user) and/or may retrieve PEP descriptions for PEPs 115 based on the element 110 of the PEP 115 such whether the element 110 is a microphone, a computer terminal, the classification (such as unclassified, secret, top secret, etc.), and/or the location of the element 110 (such as if the element 110 is located in a moveable vehicle, located in a foreign country, and/or located at a computer terminal shared by foreign nationals).

The policy management agent 150 is configured to utilize the PEP description of the PEP 115 to search the library 155 to locate and determine matching (candidate) policies (which match the PEP description of the PEP in the mapping table 160) at operation 606.

Further, the PMA 150 is configured to present the matching (candidate) policies to the user in a GUI via the display 45. The user can utilize the user interface 50 to select a set of matching policies for deployment by the PMA 150 into the policy repository 135. For example, the PMA 150 is configured to store a copy of the set of policies from the library 155 into the policy repository 135. The policy decision point (PDP) is configured to access to the policy repository 135 to obtain the set of policies for a requesting PEP 115, and the PDP 125 is configured to evaluate policy decisions for the requesting PEP 115 based on the set of policies in the policy repository 135 for that requesting PEP 115. Also, by parsing the matching (candidate) policies, the PMA 150 is configured to automatically determine which matching (candidate) policies to select as a set of matching policies for deployment by the PMA 150 into the policy repository 135. For example, for deployment into the policy repository 135, the PMA 150 may select matching (candidate) policies to include in the set of matching policies based on predetermined criteria such based a predetermined priority list for policies, based on the size of the policies, based on the criticalness of the policy (e.g., a policy that prevents access to a sensitive database), etc.

Although (at times) examples have been provided for a single PEP 115, it is understood that the PMA 150 is configured to present a set of registered PEPs 115 from the PEP registry 140 to the user. The PMA 150 is configured to allow the user to select one or more registered PEPs 115 from the registered PEPs 115 presented. The PMA 150 receives the selection of registered PEPs 115 to be designated as selected registered PEPs 115. Just like for a single PEP 115, the PMA 150 is configured to retrieve respective PEP descriptions for each of the selected registered PEPs from PEP registry 140. The PMA 150 utilizes the respective PEP descriptions (in the mapping table 160) for each of the selected registered PEPs 150 to search the library 155 to locate and determine respective matching policies. In the GUI, the PMA 150 is configured to combine the PEPs 115 to their respective matching policies (e.g., in a table) to display to the user. For each PEP 115 combined with its matching policies in the display table, the user can then select which matching policies to deploy.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the exemplary embodiments of the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method for policy management, comprising:
registering, by a policy decision point, a policy enforcement point (PEP) description for a policy enforcement point (PEP) in a PEP registry, in which the policy decision point assigns a policy enforcement identification code to the policy enforcement point during registration;
wherein the policy decision point is configured to make a decision for the policy enforcement point;
wherein the policy decision point is configured to require the policy enforcement point to register before the policy enforcement point is allowed to request the decision;
wherein when the policy decision point registers the policy enforcement point, the policy decision point is configured to receive in advance an estimate of an expected load of policy evaluation requests from the policy enforcement point being registered;
retrieving by a policy management agent the PEP description of the PEP from the PEP registry; and
utilizing by the policy management agent the PEP description of the PEP to search a library to locate and determine matching policies, wherein the matching policies match the PEP description of the PEP.

2. The method of claim 1, further comprising displaying by the policy management agent the matching policies to an administrator;
wherein during the registration by the policy decision point, the policy enforcement point is configured to submit metadata which comprises the estimate of the expected load of policy evaluation requests that will be made to the policy decision point, an average rate of the policy evaluation requests, and inter-request time of the policy evaluation requests; and wherein the policy decision point is configured to determine whether to accept the policy enforcement point based on the metadata submitted by the policy enforcement point.

3. The method of claim 1, further comprising receiving by the policy management agent a selection of the matching polices to be a set of policies for deployment;
wherein the set of policies are selected by at least one of: an administrator and the policy management agent.

4. The method of claim 3, further comprising deploying by the policy management agent the set of policies.

5. The method of claim 4, wherein the policy management agent stores a copy of the set of policies from the library into a policy repository.

6. The method of claim 5, wherein the policy decision point (PDP) is configured to access the policy repository;
wherein in response to a request from the PEP to evaluate policy decisions for the PEP, the PDP is configured to utilize the PEP description of the PEP to search the policy repository to locate and determine the set of policies, wherein the set of policies match the PEP description of the PEP; and
wherein the PDP is configured to evaluate policy decisions for the PEP based on the set of policies in the policy repository.

7. The method of claim 1, further comprising at least one of:
presenting by the policy management agent a set of registered PEPs from the PEP registry to an administrator and allowing the administrator to select one or more registered PEPs from the registered PEPs; and
determining by the policy management agent the set of registered PEPs from the PEP registry and automatically selecting by the management agent one or more registered PEPs from the registered PEPs.

8. The method of claim 7, further comprising receiving by the policy management agent a selection of registered PEPs from the set of registered PEPs as selected registered PEPs.

9. The method of claim 8, further comprising retrieving by the policy management agent respective PEP descriptions for each of the selected registered PEPs from the PEP registry; and
utilizing by the policy management agent the respective PEP descriptions for each of the selected registered PEPs to search the library to locate and determine matching policies, wherein the matching policies respectively match the PEP descriptions for the selected registered PEPs.

10. The method of claim 9, further comprising combining the matching policies to respective PEPs of the registered PEPs;
wherein the policy management agent presents each of the selected registered PEPs with its respective matching policies to the administrator.

11. The method of claim 1, wherein the library comprises a plurality of policies.

12. The method of claim 1, wherein for the PEP, the PEP description in the PEP registry comprises at least one of a name, a class, instance information, attributes, and a PEP type.

13. The method of claim 1, wherein the PEP registry comprises a plurality of registered PEPs;
wherein each of the plurality of registered PEPs has previously registered with the PDP; and
wherein the PEP registry comprises respective PEP descriptions for each of the plurality of registered PEPs.

14. A device configured for policy management, comprising:
memory for storing a program; and
a processor, functionally coupled to the memory, the processor being responsive to computer-executable instructions contained in the program and operative for:
retrieving, by a policy decision point, a policy enforcement point (PEP) description for a policy enforcement point (PEP) from a PEP registry in which the policy decision point assigns a policy enforcement identification code to the policy enforcement point when the policy decision point registers the policy enforcement point;
wherein the policy decision point is configured to make a decision for the policy enforcement point;
wherein the policy decision point is configured to require the policy enforcement point to register before the policy enforcement point to register before the policy enforcement point is allowed to request the decision;
wherein when the policy decision point registers the policy enforcement point, the policy decision point is configured to receive in advance an estimate of an expected load of policy evaluation requests from the policy enforcement point being registered; and
utilizing the PEP description of the PEP to search a library to locate and determine matching policies, wherein the matching policies match the PEP description of the PEP.

15. The device of claim 14, further comprising presenting the matching policies to an administrator.

16. The device of claim 14, further comprising receiving a selection of the matching polices to be a set of policies for deployment;
wherein the set of policies are selected by at least one of: an administrator and the program.

17. The device of claim 14, further comprising deploying the set of policies.

18. The device of claim 14, further comprising at least one of:
presenting a set of registered PEPs from the PEP registry to an administrator, and allowing the administrator to select one or more registered PEPs from the registered PEPs; and
determining the set of registered PEPs from the PEP registry, and automatically selecting one or more registered PEPs from the registered PEPs.

19. The device of claim 18, further comprising receiving a selection of registered PEPs from the set of registered PEPs as selected registered PEPs; and
presenting each of the selected registered PEPs with its respective matching policies to the administrator.

20. A system for policy management, comprising:
a processor configured to run a policy decision point;
wherein the policy decision point is configured to register a policy enforcement point (PEP) description for a policy enforcement point (PEP) in a PEP registry, in which the policy decision point assigns a policy enforcement identification code to the policy enforcement point during registration;
wherein the policy decision point is configured to make a decision for the policy enforcement point; and
wherein the policy decision point is configured to require the policy enforcement point to register before the policy enforcement point is allowed to request the decision;
wherein when the policy decision point registers the policy enforcement point, the policy decision point is configured to receive in advance an estimate of an expected load of policy evaluation requests from the policy enforcement point being registered;

a policy management agent;
a library comprising a plurality of policies;
the policy management agent configured to retrieve the policy enforcement point (PEP) description for the policy enforcement point from the PEP registry; and
the policy management agent configured to utilize the PEP description of the PEP to search the library to locate and determine matching policies in the library, wherein the matching policies match the PEP description of the PEP.

* * * * *